United States Patent [19]
Young

[11] Patent Number: 5,924,437
[45] Date of Patent: Jul. 20, 1999

[54] EXTERNAL SHUTOFF VALVE FOR FIRE HYDRANTS

[76] Inventor: Richard J Young, 1304 Hendrix Landing Rd., Lexington, S.C. 29072-9714

[21] Appl. No.: 09/118,398

[22] Filed: Jul. 17, 1998

Related U.S. Application Data

[60] Provisional application No. 60/052,864, Jul. 17, 1997.
[51] Int. Cl.[6] ............................ F16L 55/18; F16K 27/00
[52] U.S. Cl. ........................... 137/15; 137/272; 137/296; 251/148
[58] Field of Search ....................... 251/148; 137/454.2, 137/272, 294, 296, 15

[56] References Cited

U.S. PATENT DOCUMENTS

| | | |
|---|---|---|
| 330,377 | 11/1885 | Coffin ............................... 137/272 X |
| 1,349,062 | 8/1920 | Goldberg . |
| 2,400,083 | 5/1946 | Fillinger . |
| 2,985,242 | 5/1961 | Papa . |
| 3,811,344 | 5/1974 | Hand . |
| 3,856,129 | 12/1974 | Peterson . |
| 3,981,482 | 9/1976 | Callahan, Jr. et al. ................. 251/148 |
| 4,161,958 | 7/1979 | Behle . |
| 4,748,997 | 6/1988 | Ragsdale . |
| 5,099,565 | 3/1992 | Campbell . |
| 5,404,899 | 4/1995 | Zabel et al. . |
| 5,609,179 | 3/1997 | Knapp . |

*Primary Examiner*—Kevin Lee
*Attorney, Agent, or Firm*—Michael A Mann; Nexsen Pruet Jacobs & Pollard LLP

[57] ABSTRACT

A kit for the emergency shutoff of a fire hydrant after the hydrant stem has failed and a cap of the hydrant nozzle has been removed so that a jet of water is escaping from the hydrant. The kit comprises a two-part increaser and a shutoff valve. The two parts of the increaser are brought together from opposing sides of the water jet and fastened to the hydrant nozzle. The increaser has a flange that mates with the flange on the shutoff valve. The bottom of the flange of the valve is bolted to the top of the flange of the increaser until secure but not tight. Then the shutoff valve is dropped so that it rotates into position, momentarily intersecting the jet of water. Once in place, the shutoff valve is tightened and the water shut off by closing the valve.

16 Claims, 4 Drawing Sheets

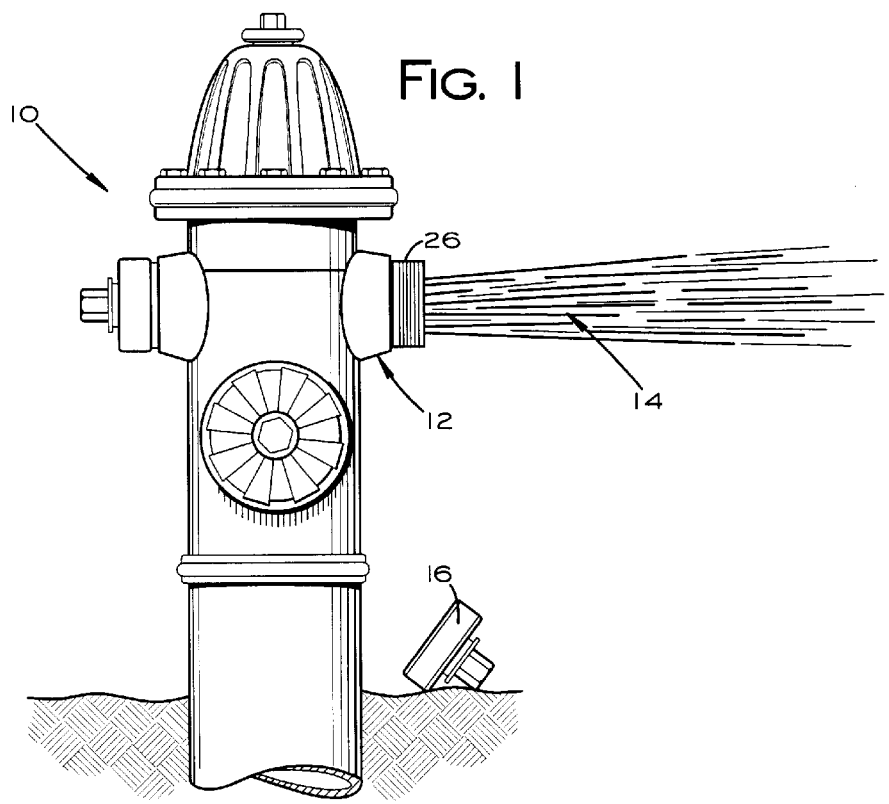
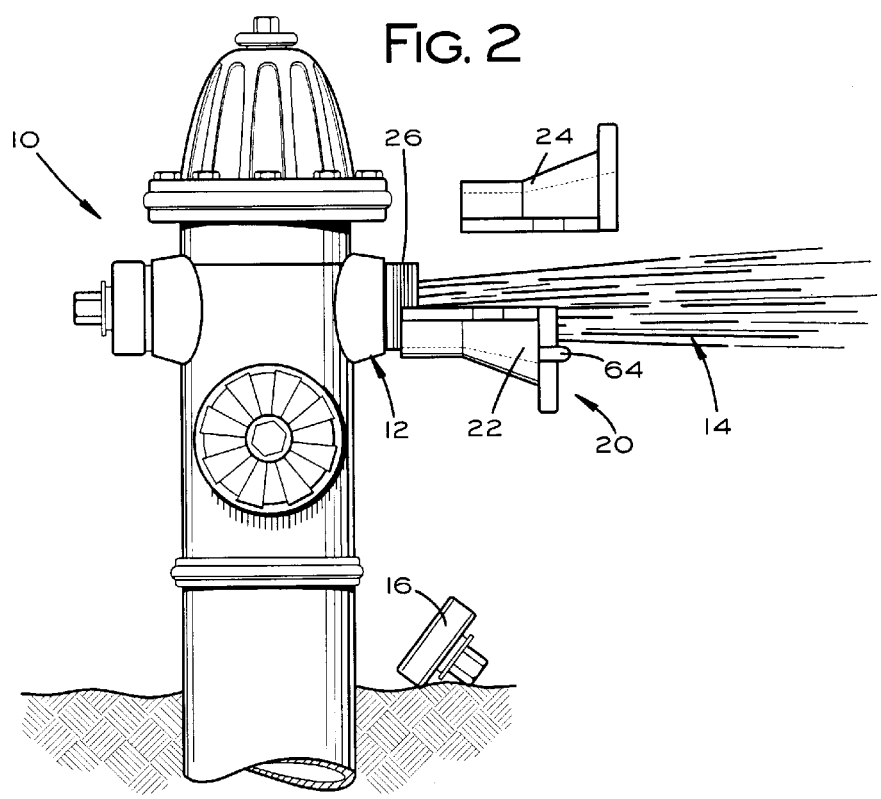

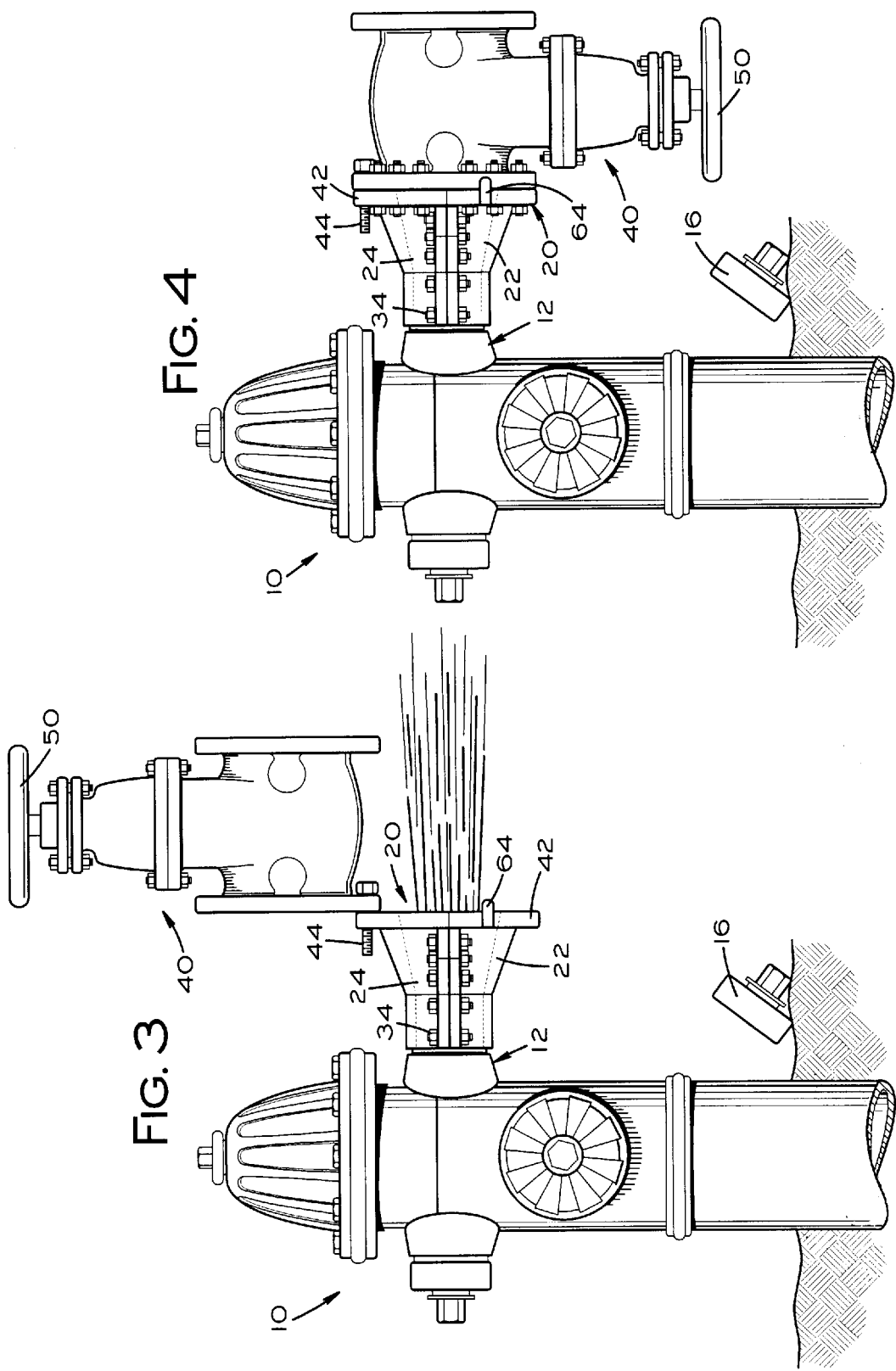

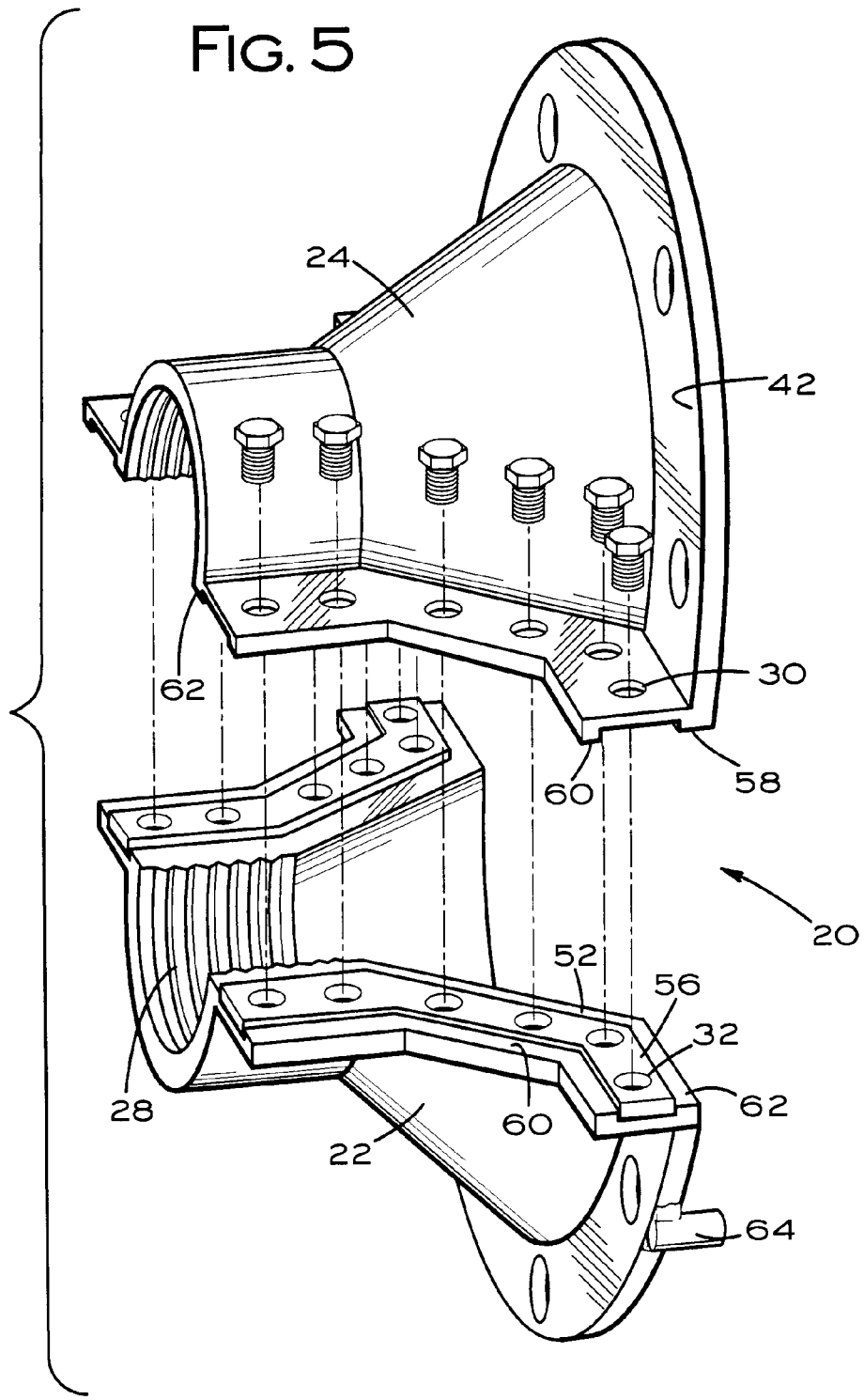

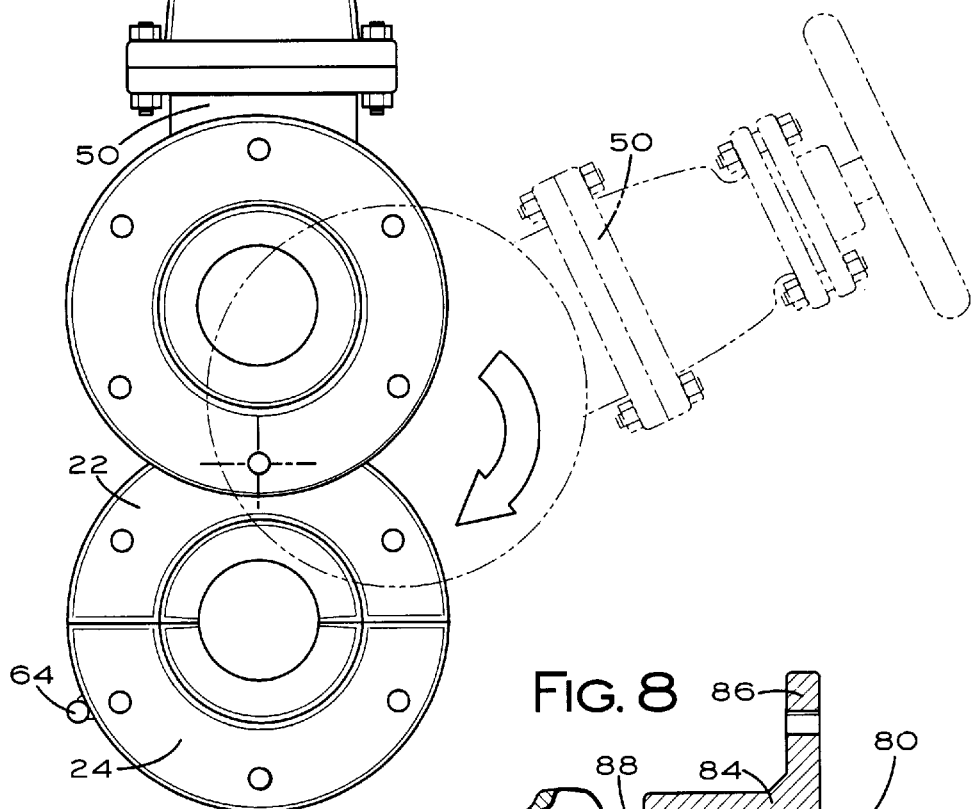
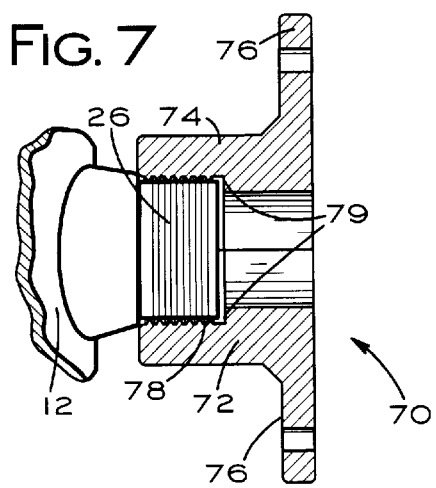

EXTERNAL SHUTOFF VALVE FOR FIRE HYDRANTS

This application claims benefits of provisional application 60/052,862 filed Jul.17, 1997.

BACKGROUND OF THE INVENTION

1. Field of the Invention:

The present invention relates to an emergency shutoff valve for fire hydrants when the hydrant stem has broken. In particular, the present invention relates to a kit for use in stopping the flow of water from the hydrant when the hydrant's stem breaks after the hydrant has been opened.

2. Discussion of Background:

Fire hydrants provide access to a water main when large quantities of water are needed for fighting fires. The hydrant contains a stem valve that is opened by turning the nut on the top of the hydrant. Turning the nut lowers a plate into the water in the main, thus allowing the water access to the upper part of the hydrant. Occasionally, when one of the nozzle caps has been removed from the hydrant and the stem breaks, water at high pressure and flow rate—perhaps 1000 gallons per minute—will shoot from the hydrant until it can be shut off by municipal water authorities. If there is a cutoff valve located near the hydrant, the water can be turned off by closing that valve, and then, in due course, repairs to the hydrant can take place. Unfortunately, not all hydrants have cutoff valves or, if they do, the valve may not be easy to locate.

Furthermore, in addition to the loss of water and loss of water pressure to local homes and businesses, the water rushing from the hydrant will wash out roads or cause damage to property. Finally, the water is issuing from the hydrant at a pressure and volume that could cause injury.

There are a number of devices for repairing hydrants and some for modifying hydrants, so that when the aforementioned problem occurs, it is solved more easily. However, unless such other devices are installed on hydrants in advance of failure, they are of no use after failure occurs.

Therefore, there remains a need for an emergency shutoff valve that can be put on a hydrant after the hydrant stem valve fails.

SUMMARY OF THE INVENTION

According to its major aspects and broadly stated, the present invention is a shutoff valve kit for use in stopping the flow of water through the nozzle of a hydrant after the stem valve of the hydrant has failed. The kit comprises an increaser that is formed in two halves so as to permit it to be installed on the hydrant without having to intersect the water jet, and a shutoff valve that mates with the flange on the increaser and can be quickly rotated into position where, by closing it, it can stop the flow of water. The smaller end of the two-part increaser has female threads that mate with the male threads on the hydrant. After the two halves of the increaser are joined together over most of the hydrant's threads, the increaser can be rotated until it is tightly coupled to the hydrant.

A feature of the present invention is the use of an increaser formed in two halves. At close range, intersecting the water jet from the hydrant is not easy to do safely. The water jet has considerable force and can knock a one-piece fitting out of a maintenance worker's grasp. By having a two-part increaser where the parts can be brought together from opposing sides of the water jet without the need to intersect it, the increaser can be safely installed. Because it has a flange, the increaser also facilitates connection of a standard shutoff valve.

The method of installing the shutoff valve is another important feature of the present invention. The use of the weight of the shutoff valve to help rotate it into place after securing it upside down to the increaser assures that the rotation will occur quickly and automatically, and that the two will stay together as the valve is rotated through the intersection with the water jet.

A kit such as that of the present invention has application in other areas in addition to broken hydrants, such as, for example, in chemical processing plants or waste processing.

These and other features and their advantages will be apparent to those skilled in the art of hydrant maintenance and repair from a careful reading of the Detailed Description of a Preferred Embodiment presented below and accompanied by the drawings.

BRIEF DESCRIPTION OF THE DRAWINGS

In the drawings,

FIG. 1 is a front view of a broken, prior art fire hydrant showing a jet of water issuing from the hydrant;

FIG. 2 is a front view of the hydrant of FIG. 1 showing the increaser being fitted onto the nozzle according to a preferred embodiment of the present invention;

FIG. 3 is a front view of the hydrant of FIG. 1 showing the shutoff valve rotatably and initially attached to the increaser, according to a preferred embodiment of the present invention;

FIG. 4 is a front view of the hydrant of FIG. 1 showing the shutoff valve rotated into position and the jet of water stopped, according to a preferred embodiment of the present invention;

FIG. 5 is a detailed, exploded, perspective view of the increaser according to a preferred embodiment of the present invention;

FIG. 6 is a side view showing the shutoff valve rotatably attached to the increaser, according to a preferred embodiment of the present invention;

FIG. 7 is a front view of the increaser with the increaser being fitted onto the nozzle according to a first alternative embodiment of the present; and FIG. 8 is a front view of the increaser with the increaser being fitted onto the nozzle according to a second alternative embodiment of the present invention.

DETAILED DESCRIPTION OF A PREFERRED EMBODIMENT

Referring now to FIGS. 1–5, there is illustrated a fire hydrant 10 according to the prior art. Fire hydrant 10 is shown with the cap 16 of one of its nozzles 12 removed and a jet of water 14 issuing therefrom as a result of a broken hydrant stem (not shown) in the hydrant. The hydrant is typical of prior art hydrants and is not part of the present invention. As stated above, prior to the present invention the need to stop jet 14 was satisfied by finding a cutoff valve nearby, if one could be found that would stop the flow to hydrant 10 before significant water damage or water loss occurred from the break.

According to the present invention, to stop the flow from hydrant 10, an increaser 20 is fitted to nozzle 12. Increaser 20 has a first half 22 and a second half 24 (best seen in FIG. 5) that fit together and are bolted to secure them. Nozzle 12 has male threads 26; increaser 20 has female threads 28 that match those of nozzle 12. To place increaser 20 onto nozzle 12, first half 22 is brought up from below jet 14 so that female threads 28 are aligned with male threads 26, and second half 24 is brought down onto first half 22 so that its female threads 28 are aligned with male threads 26 of nozzle 12 and bolt holes 30 of first half 22 are aligned with bolt holes 32 of second half 24. Then bolts 34 are used to secure first half 22 to second half 24. Finally, increaser 20 is rotated until secured to nozzle 12 of hydrant 10. Meanwhile jet 14 continues but has not been intersected by placing increaser 20 onto nozzle 12. The word "intersected" means that part of the cross-sectional area defined by jet 14 and perpendicular to the flow of jet 14 has been trespassed by increaser 20, which thereby interferes with the flow of water.

Next a shutoff valve 40 is attached upside down and in the open flow position to a flange 42 on increaser 20 using a bolt 44. Bolt 44 is threaded completely through flange 42 but is not tightened. Rather, it is loose enough to leave valve 40 free to rotate about bolt 44, but not so loose that valve 40 will come off easily when it is rotated into position. Again, jet 14 is not intersected by this step of the operation.

Then shutoff valve 40 is allowed to rotate from its initial upside down position to right side up, as illustrated by comparing FIGS. 3 and 4. By doing so, valve 40 does intersect jet 14, but only briefly. A stop 64 positioned on first half 22 of increaser 20 prevents or stops further rotation of shutoff valve 40 so that shutoff valve 40 is aligned with increaser 20. Furthermore, because bolt 44 secures valve 40 to increaser 20, valve 40 remains secured to increaser 20 despite the pressure of jet 14. Once in place, shutoff valve 40 can be closed using wheel 50 to stop jet 14 from flowing. Valve 40 can also be closed if it has a nut connected to its internal stem, but a wheel is quicker because the valve can be closed by hand. It will be clear that valve 40 may also have a lever or other closure means.

Preferably, increaser 20 has gaskets 52 and 54 on both first half 22 and second half 24 located on faces 56 and 58, respectively. On either side of gaskets 52, 54, are lips 60 and 62 that engage when first and second halves 22, 24 are brought together. Gaskets 52, 54 are deformed slightly in this process to seal first and second halves 22, 24 together and to stop leakage. Gaskets can be made of manmade or synthetic rubber or other resilient, waterproof material and are securely glued to first and second halves 22, 24 prior to use.

Increaser 20 provides a means for attaching shutoff valve 40 to hydrant 10 without intersecting jet 14 until valve 40 is to be rotated into position. However, once properly bolted, it is unlikely that valve 40 will come loose when rotated.

Once jet 14 is stopped, there is then time to find the hydrant cutoff valve and shut off the water to the hydrant at a convenient time for making repairs to its stem.

In a first alternative embodiment illustrated in FIG. 7, increaser 70 is modified to reduce the overall length. Both first half 72 and second half 74 of increaser 70 have only sufficient female threading 78 to couple with male threading 26 of nozzle 12. Increaser 70 is secured to nozzle 12 using bolts as described in the preferred embodiment; however, a ledge 79 is positioned adjacent to female threading 78 to prevent further rotation of increaser 70.

A second preferred embodiment is illustrated in FIG. 8. This embodiment allows increaser 80 having a first half 82 and a second half 84 to adapt to various sizes of nozzles 12 using gaskets 90 in conjunction with thread 88. First half 82 and second half 84 are positioned over nozzle with bolts as described in the preferred embodiment; however, bolts are tightened to a point that allows thread 88 to securely engage male threading 26 of nozzle 12. In this process, gaskets resiliently comform to the size of nozzle 12.

It will be apparent to those skilled in the art that, although the present invention has been described with respect to a broken hydrant stem, it is equally applicable in other applications, such as in processing chemicals, particularly toxic or caustic chemical, and in waste processing. Moreover, those skilled in the art will readily see that many changes and substitutions can be made to the preferred embodiment herein described without departing from the spirit and scope of the present invention as defined by the appended claims.

What is claimed is:

1. A kit for shutting off a fire hydrant having a nozzle defining an orifice, said kit comprising:
    a shutoff valve; and
    means for connecting said shutoff valve to the hydrant nozzle, said connecting means attachable to the nozzle without intersecting the orifice.

2. The kit as recited in claim 1, wherein said connecting means is an adaptor having a first part and an opposing second part, said first part being fastenable to said second part.

3. The kit as recited in claim 1, wherein said connecting means has means for attaching said shutoff valve to said connecting means so that said shutoff valve can be attached upside down and then rotated into position for shutting off the fire hydrant.

4. The kit as recited in claim 1, further comprising means for aligning said shutoff valve with said connecting means.

5. The kit as recited in claim 1, wherein said connecting means has means for attaching said shutoff valve to said connecting means so that said shutoff valve can be attached upside down and then rotated, and wherein said kit further comprises means for aligning said shutoff valve with said connecting means when said shutoff valve is rotated so that said shutoff valve and said connecting means are then in position for shutting off the fire hydrant.

6. The kit as recited in claim 1, wherein said connecting means has means for attaching said shutoff valve to said connecting means so that said shutoff valve can be attached upside down and then rotated, and wherein said kit further comprises means for stopping the rotation of said shutoff valve when said shutoff valve has been rotated into position with respect to said connecting means.

7. The kit as recited in claim 2, further comprising means for sealing said first part to said second part.

8. A kit for shutting off a fire hydrant having a nozzle defining an orifice, said kit comprising:
    a shutoff valve; and
    an increaser having a first portion and an opposing second portion, said first and second portions being attachable together, said first portion and said second portion attachable to the nozzle without intersecting the orifice, said increaser having means formed thereon for connecting said shutoff valve.

9. The kit as recited in claim 8, wherein said first portion and said second portions are substantially symmetric halves of said increaser.

10. The kit as recited in claim 8, wherein said increaser has a first end and an opposing second end, said first end being threaded for threading to the nozzle.

11. The kit as recited in claim 8, wherein said increaser has a first end and an opposing second end, said second end having a flange for connecting said shutoff valve to said increaser.

12. The kit as recited in claim 8, wherein said increaser carries means for aligning said shutoff valve with said increaser.

13. The kit as recited in claim 8, wherein said shutoff valve is connected to said increaser upside down and then rotated into position, and wherein said kit further comprising means for stopping said shutoff valve when said shutoff valve has rotated into position with respect to said increaser.

14. The kit as recited in claim 8, wherein said first and said second portions of said increaser carry means for sealing said first to said second portions.

15. The kit as recited in claim 8, wherein said shutoff valve is closable using a stopper selected from the group consisting of a wheel, a nut and a lever.

16. A method for shutting off a fire hydrant having a threaded nozzle and having water issuing through said nozzle under high pressure and high volume, said method comprising the steps of:

bringing two halves of an adaptor together from opposing sides of said nozzle onto threads of said threaded nozzle;

fastening said two halves together;

partially connecting an open shutoff valve to said adaptor so that said shutoff valve is right side up and vertically elevated over said water and is rotatable;

rotating said shutoff valve so that it is upside down;

completely connecting said shutoff valve to said adaptor so that said shutoff valve does not rotate; and closing said shutoff valve.

* * * * *